(12) United States Patent
Kobayashi

(10) Patent No.: US 6,434,105 B1
(45) Date of Patent: Aug. 13, 2002

(54) OPTICAL PICKUP DEVICE

(75) Inventor: Shohei Kobayashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/468,065

(22) Filed: Dec. 20, 1999

(30) Foreign Application Priority Data

Dec. 25, 1998 (JP) .......................................... 10-370345
Apr. 14, 1999 (JP) .......................................... 11-106579

(51) Int. Cl.$^7$ ................................................ G11B 7/00
(52) U.S. Cl. ................................................. 369/112.28
(58) Field of Search .......................... 369/44.23, 44.14, 369/44.15, 44.22, 13.33, 112.2, 112.23, 112.24, 112.28

(56) References Cited

U.S. PATENT DOCUMENTS

| | | | | |
|---|---|---|---|---|
| 4,904,068 A | * | 2/1990 | Tatsuno et al. | 369/112.28 |
| 5,239,414 A | * | 8/1993 | Reno | 369/112.28 |
| 5,477,386 A | * | 12/1995 | Okuda et al. | 369/112.28 |
| 5,761,177 A | * | 6/1998 | Muneyoshi et al. | 369/112.04 |
| 5,828,644 A | * | 10/1998 | Gage et al. | 369/44.14 |
| 5,881,043 A | * | 3/1999 | Hasegawa et al. | 369/112.21 |

* cited by examiner

*Primary Examiner*—Thang V. Tran
(74) *Attorney, Agent, or Firm*—Frishauf, Holtz, Goodman & Chick, P.C.

(57) ABSTRACT

An optical pickup device comprises a light source, a beam converting optical system for converting a light beam emitted from the light source to a light beam having substantially circular distribution of quantity of light, an objective optical section for converging the light beam on an optical recording medium, and a signal detecting system for reproducing information recorded on the optical recording medium. The signal detecting system includes a separating optical element for separating a return light beam from a go light beam, and an signal detecting section for detecting an information signal based on the separated return light beam. The beam converting optical system has a first beam converting prism and a second beam converting prism, each of which has two optical surfaces nonparallel to each other. One of them is an entrance surface through which a light beam to be converted enters and the other is an exit surface through which the converted light beam exits. Each of the first and second beam converting prisms is arranged so that the entrance surface is oblique with respect to the optical axis and the exit surface is perpendicular to the optical axis.

11 Claims, 5 Drawing Sheets

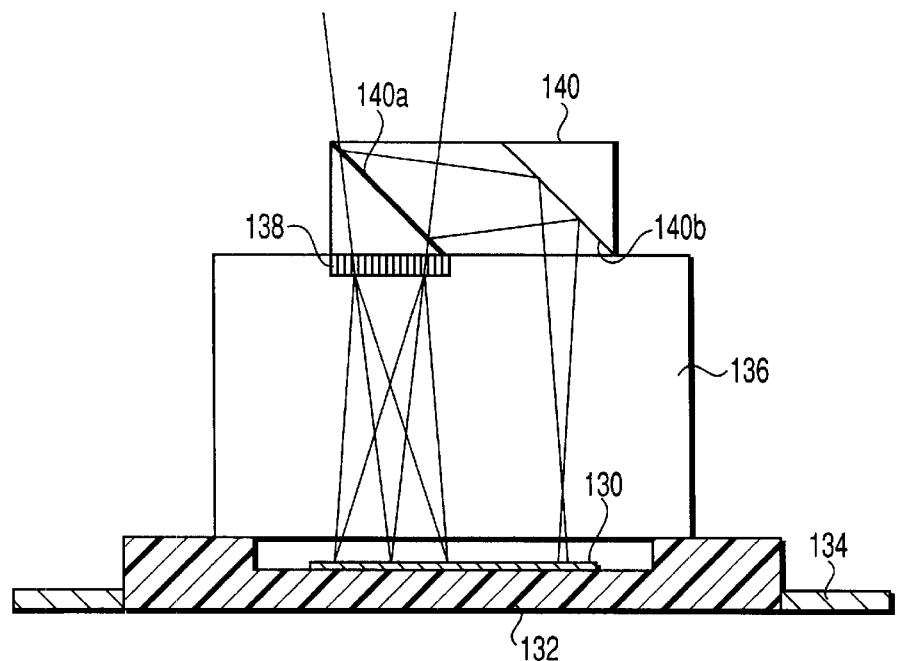
FIG. 2
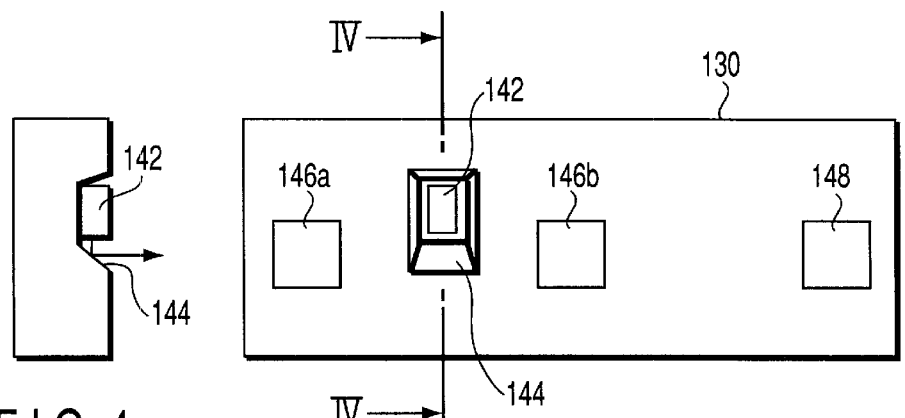
FIG. 4
FIG. 3
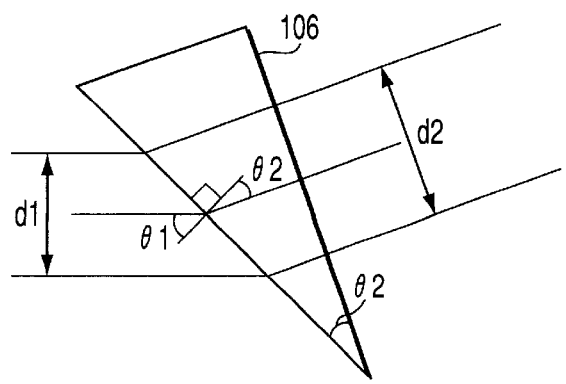
FIG. 5

OPTICAL PICKUP DEVICE

BACKGROUND OF THE INVENTION

The present invention relates to an optical pickup device for use in an optical disk apparatus for recording and reproducing data at high density.

It is required that the optical disk apparatus be compact, light and low in cost. To satisfy the requirements, various integrated optical units are proposed. An integrated optical unit constitutes an optical pickup device in combination with an objective optical system for converging a light beam on an optical disk, and if necessary, a collimate lens. An integrated optical unit includes a number of components necessary for an optical pickup device, for example, a semiconductor laser, a photodiode, a prism for splitting an optical path, and a hologram element. These components are contained in a single package.

The optical disk apparatus is also required to operate at a high speed. The high speed operation is generally achieved by increasing the rotation speed of the optical disk, thereby increasing the data transfer rate. Writing of data at a high rotation speed requires high laser power. However, since a semiconductor laser used as a light source has a limited output, the optical pickup device is required to have low optical loss and high coupling efficiency.

A light beam emitted from a semiconductor laser generally has elliptic distribution of quantity of light. For this reason, an optical pickup device that converges a light beam without changing the distribution of quantity of light has low coupling efficiency, since part of the elliptic distribution along the major axis is not utilized. To improve the coupling efficiency, a preferable optical pickup device includes a beam converting system for converting a light beam having elliptic distribution of quantity of light generally emitted from the semiconductor laser to a light beam having circular distribution of quantity of light. The use of such a beam converting optical system is indispensable for an optical disk apparatus particularly for recording and reproducing data at high density.

As described above, the conventional optical pickup device produces some results from an aspect of reduction in size, weight and cost of the optical disk apparatus, through the use of an integrated optical unit, and from an aspect of increase in operation speed of the optical disk apparatus through the use of a beam converting optical system.

However, demands for reduction in size, weight and cost and increase in operation speed of the optical disk apparatus will continuously increase. Therefore, it is requested that a further improved optical pickup device advantageous in these aspects be provided.

BRIEF SUMMARY OF THE INVENTION

An object of the present invention is to provide an optical pickup device further improved in aspects of reduction in size, weight and cost and increase in operation speed of an optical apparatus, and particularly an optical pickup device having an improved beam converting optical system.

Another object of the present invention is to provide an optical pickup device having a beam converting optical system adapted to be combined with an integrated optical unit.

A still another object of the present invention is to provide an optical pickup device having a beam converting optical system which contributes to improvement of the S/N ratio of an optical disk apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross-sectional view of the integrated optical unit shown in FIG. 1;

FIG. 3 is a plan view of the semiconductor substrate shown in FIG. 2;

FIG. 4 is a cross-sectional view of the semiconductor substrate taken along the line IV—IV in FIG. 3;

FIG. 5 is a diagram for explaining an operation of a beam converting prism;

DETAILED DESCRIPTION OF THE INVENTION

FIRST EMBODIMENT

An optical pickup device according to a first embodiment of the present invention will be described with reference to FIGS. 1 to 7.

Structure

Figure 1:
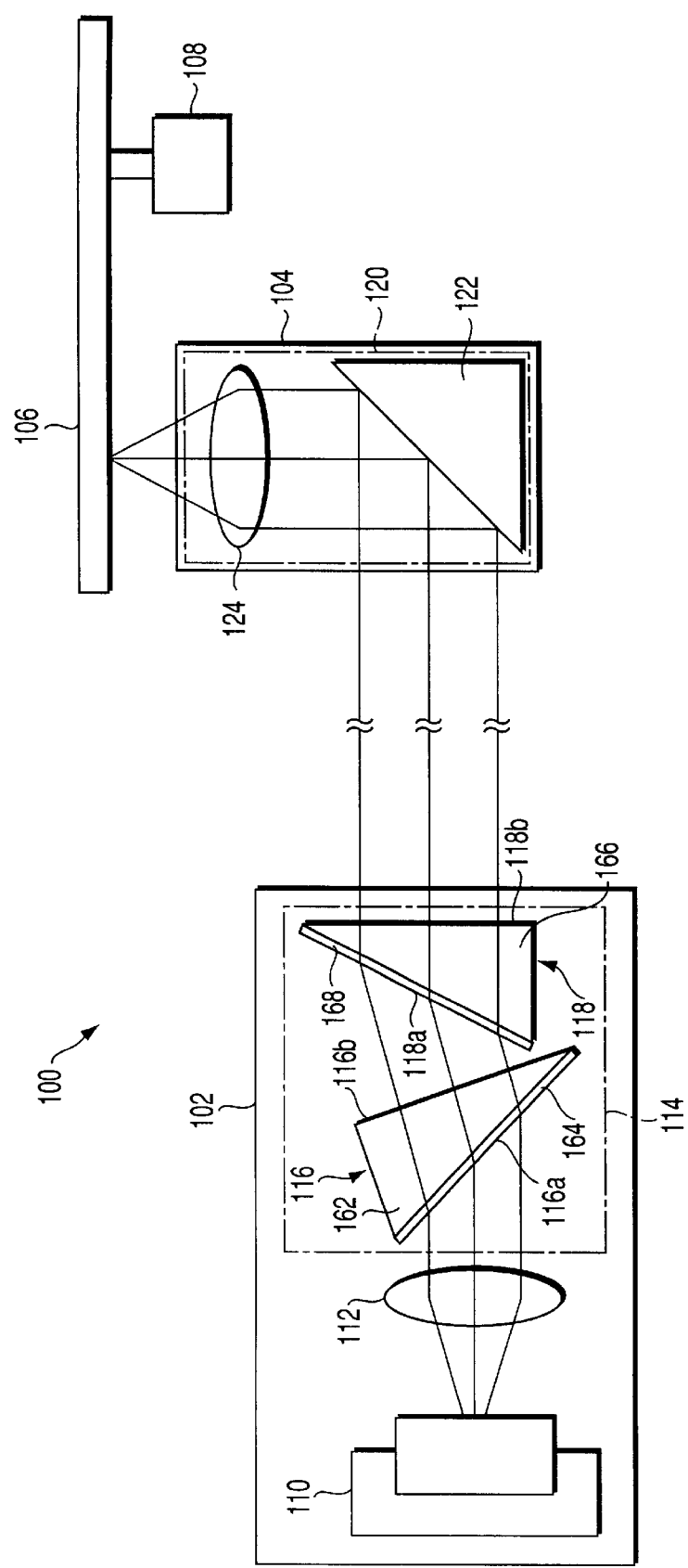
FIG. 1 is a schematic view of an optical pickup device according to a first embodiment of the present invention, illustrating that a movable optical system is rotated 90° about the optical axis relative to a fixed optical system.

As shown in FIG. 1, the optical pickup device comprises a fixed optical system 102 and a movable optical system 104 movable in a radial direction of an optical disk 106. The optical disk 106 is rotatably supported by a spindle motor 108. The optical disk 106 has a recording film, which stores information. The information corresponds to changes in reflectivity of the recording film, as in a phase change disk and a ROM disk.

The fixed optical system 102 comprises an integrated optical unit 110 including a semiconductor laser serving as a light source, a photodiode for detecting a signal, a collimate lens 112 for collimating a diverging light beam emitted from the integrated optical unit 110, and a beam converting optical system 114 for converting an incident light beam generally having elliptic distribution of quantity of light to a light beam having substantially circular distribution of quantity of light.

The beam converting optical system 114 has a first beam converting prism 116 and a second beam converting prism 118. As used herein, the term "converting prism" refers an optically transparent element having two optical surfaces nonparallel to each other and crossing the optical axis. One of the optical surfaces, through which an incident light beam to be converted enters, is referred herein an entrance surface, and the other optical surface, from which a converted light beam exits, is referred herein an exit surface.

The first and second beam converting prisms 116 and 118 are arranged so that entrance surfaces 116a and 118a of the beam converting prisms 116 and 118 are oblique with respect to the optical axis, whereas exit surfaces 116b and 118b are perpendicular to the optical axis, respectively. The entrance surfaces 116a and 118a obliquely crossing the optical axis actually refract a light beam and change the shape of distribution of quantity of light of the beam. Therefore, the entrance surfaces 116a and 118a are also referred herein beam converting surfaces.

The beam converting prisms 116 and 118 respectively comprise transparent main bodies 162 and 166, each of which has two surfaces nonparallel to each other, and antireflection films 164 and 168 formed on one of the surfaces of the main bodies 162 and 166, respectively. The antireflection films 164 and 168 have exposed surfaces which define the entrance surfaces 116a and 118a, respectively. The others of the surfaces of the main bodies 162 and 166 define the exit surfaces 116b and 118b, respectively.

The beam converting prisms 116 and 118 may have the same vertex angle or different vertex angles. The term "vertex angle" refers herein an angle formed by the two nonparallel optical surfaces of the prism. The beam converting prisms 116 and 118 may be made of the same material or different materials. Preferred beam converting prisms 116 and 118 have the same optical characteristics. Therefore, the preferred beam converting prisms 116 and 118, for example, have the same vertex angle and are made of the same material.

Further, the beam converting prisms 116 and 118 are arranged symmetrical with respect to the optical axis. In other words, the beam converting prisms 116 and 118 are located so that the vertex angles thereof are on the opposite sides of the optical axis. Therefore, the inclination of the incident light beam to the entrance surface 116a of the beam converting prism 116 is reverse in sign to the inclination of the incident light beam to the entrance surface 118a of the beam converting prism 118.

More specifically, on the plane of FIG. 1, it is assumed that an angle to a normal to the entrance surface in a clockwise direction from the normal is positive and that in a counterclockwise direction from the normal is negative. On this assumption, a light beam incident on the entrance surface 116a of the beam converting prism 116 has a positive incident angle, whereas a light beam incident on the entrance surface 118a of the beam converting prism 118 has a negative incident angle.

The movable optical system 104 includes an objective optical section 120 for converging a light beam from the fixed optical system 102 on the recording film of the optical disk 106. The objective optical section 120 has a mirror 122 for 90° deflecting a light beam and an objective lens 124 for converging the deflected light beam on the recording film of the optical disk 106.

As shown in FIG. 1, the integrated optical unit 110 has a semiconductor substrate 130 including a semiconductor laser and a photodiode, a package 132 on which the semiconductor substrate 130 is fixed, a lead 134 for taking out an electric signal, a hologram element 136 including a hologram region 138, and a small prism 140.

As shown in FIGS. 3 and 4, the semiconductor substrate 130 has a recess 144 formed in an upper surface portion thereof, a semiconductor laser chip 142 fixed to the bottom of the recess, a pair of servo signal detecting sections or photodiodes 146a and 146b for detecting a servo signal, and an information signal detecting section or a photodiode 148 for detecting an information signal.

Operation

As shown in FIG. 4, a light beam emitted from the semiconductor laser chip 142 in a horizontal direction (in the direction parallel to the upper surface of the semiconductor substrate 130 in FIG. 4) is reflected by an inclined surface of the recess 144 of the semiconductor substrate 130 and deflected in a vertical direction (in the direction perpendicular to the upper surface of the semiconductor substrate 130 in FIG. 4).

In general, a light beam emitted from a semiconductor laser has elliptic distribution of quantity of light. In FIG. 2, the laser beam has a narrow angle of divergence in the horizontal direction in the drawing and a wide angle of divergence in the direction perpendicular to the plane of the drawing. The light beam is projected out of the integrated optical unit 110, passing through the hologram element 136, the hologram region 138 and the prism 140.

The light beam projected from the integrated optical unit 110 is substantially collimated by the collimate lens 112, as shown in FIG. 1. The substantially collimated light beam, which still has elliptic distribution of quantity of light, in FIG. 1, is narrow in the vertical direction of the drawing and wide in the direction perpendicular to the plane of the drawing.

The substantially collimated light beam having elliptic distribution of quantity of light is converted by the beam converting optical system 114 to a light beam having substantially circular distribution of quantity of light. More specifically, the light beam having elliptic distribution of quantity of light is converted by the first beam converting prism 116 to a light beam having circularly elliptic distribution of quantity of light, which is then converted by the second beam converging prism 118 to a light beam having much circularly elliptic distribution of quantity of light, i.e., substantially circular distribution of quantity of light.

For example, the ratio of the major axis to the minor axis of the ellipse of the distribution of quantity of light that enters the beam converting optical system 114 is about 2.5. The ratio of the major axis to the minor axis of the ellipse of the distribution of quantity of light that has passed through the beam converting optical system 114 is preferably about 1.5 or less, and most preferably 1.

The light beam that has passed through the beam converting optical system 114 enters the movable optical system 104 as shown in FIG. 1. In the movable optical system 104, the light beam is 90° deflected by the mirror 122, and then converged by the objective lens 124 on the recording film of the optical disk 106.

The light beam reflected by the optical disk 106 returns to the integrated optical unit 110 through the same path as described above in the reverse direction. As shown in FIG. 2, a part of components of the reflected light beam is reflected by a beam split surface 140a of the small prism 140 toward the right in the drawing and the other part of the components of the reflected light beam is transmitted through the prism 140. A beam of the reflected light components is directed by a reflection surface 140b toward the information signal detecting photodiode 148 (FIG. 3) on the semiconductor substrate 130.

The photodiode 148 outputs an electric signal corresponding to the intensity of the incident light. The light reflected by the optical disk 106 has intensity corresponding to a change in reflectivity of the recording film. Therefore, an output signal from the photodiode 148 corresponds to the change in reflectivity of the recording film, i.e., the recorded information, based on which the information is reproduced.

On the other hand, a beam of the light components transmitted through the small prism 140 is diffracted and split into two by the hologram region 138 formed in the surface portion of the hologram element 136. The diffracted light beams enter the servo signal detecting photodiodes 146a and 146b (FIG. 3), respectively. The photodiodes detect, for example, a focus error signal indicating a focus error or a tracking error signal indicating a tracking error.

The movable optical system 104 is allowed by driving means (not shown) to move left and right in FIG. 1, i.e., in radial directions of the optical disk 106. The objective lens 124 is also allowed by an actuator (not shown) to move up and down (focusing directions) and left and right (tracking directions) in FIG. 1. Therefore, a focused spot of the light beam can be moved to a desired position of the optical disk 106, while maintaining the focused spot. Thus, information can be recorded or reproduced.

Operation of Beam Converting Prism

An operation of a beam converting prism will now be described with reference to FIG. 5. Although FIG. 5 shows the first beam converting prism 116 as a representative, the following description also applies to the second beam converting prism 118.

An incident angle $\theta_1$ of the light beam with respect to the entrance surface of the beam converting prism 116 and an refracting angle $\theta_2$ has the following relationship on the basis of the Snell's law of refraction:

$$\sin \theta_1 = n \cdot \sin \theta_2 \quad (1),$$

where n denotes an index of refraction of the beam converting prism 116. The ratio k of a beam diameter $d_1$ before refraction of the light beam to a beam diameter $d_2$ after the refraction is represented by the following equation:

$$k = d_2/d_1 = \cos \theta_2 / \cos \theta_1 \quad (2).$$

When the equation (1) is applied to the equation (2), the ratio k of the beam diameters is represented by the following equation.

$$k = \cos \theta_2 / (1 - n_2 \cdot \sin^2 \theta_2)^{1/2} \quad (3).$$

Thus, the beam converting prism 116 has a function of enlarging the diameter of the light beam in a direction parallel to the plane of the drawing of FIG. 5, and the power is represented by k obtained by the equation (3). The beam converting prism 116 have no influence on the light beam in a direction perpendicular to the plane of the drawing of FIG. 5.

As can be understood from FIG. 1, the diameter of the light beam is enlarged by the beam converting prism 116, and subsequently by the beam converting prism 118 in the same manner. Therefore, the diameter of the light beam is enlarged by $k^2$ times in the direction parallel to the plane of the drawing of FIG. 1 as a result of passing through the two beam converting prisms 116 and 118.

The value of k is selected such that the distribution of quantity of the light passed through the two beam converting prisms 116 and 118 is a substantial circle, and more preferably a perfect circle. In other words, the value of k is selected particularly preferably such that the length of the major axis of the elliptic distribution of quantity of light emitted from the semiconductor laser be equal to $k^2$ times the length of the minor axis thereof.

As described before, since the exit surface of the beam converting prism 116 is perpendicular to the optical axis, the vertex angle (the angle formed by the entrance surface and the exit surface) of the beam converting prism 116 is equal to the refracting angle $\theta_2$ of the light beam, as shown in FIG. 5. Therefore, the vertex angle $\theta_2$ of the beam converting prism 116 and the incident angle $\theta_1$ of the light beam with respect to the entrance surface of the beam converting prism 116 are determined in accordance with the value of k selected as described above by the equations (3) and (1). The same applies to the beam converting prism 118.

Consequently, the vertex angles of the two beam converting prisms 116 and 118 and the incident angles of the light beams with respect to the entrance surfaces of the prisms 116 and 118 are selected such that the beam passed through the two prisms is preferably a substantial circle, and more preferably a perfect circle.

S/N Ratio Improving Function

The optical pickup device of the present embodiment has a considerable advantage in the following respect. Since the beam converting optical system 114 comprises the two beam converting prisms 116 and 118, the optical pickup device of the present embodiment can detect a signal at a higher S/N ratio as compared to a conventional optical pickup device which has a beam converting optical system including a single beam converting prism. In other words, the optical pickup device of the present embodiment is advantageous in that, for transmittance required for the beam converting optical system, an antireflection film can be easily produced.

Since the light beam pass through the beam converting optical system twice in a go passage and a return passage, the beam converting optical system must transmit the light beams efficiently. Accordingly, the antireflection films 164 and 166 must transmit both go and return light beams at high efficiency.

In general, the return light beam has polarized components different from those of the go light beam. In other words, the ratio of p-polarized light to s-polarized light of the go light beam is different from that of the return light beam. Therefore, the antireflection films 164 and 166 must efficiently transmit both p-polarized light and s-polarized light.

In a case where the beam converting optical system 114 comprises a single beam converting prism as in the conventional apparatus, if the beam converting ratio of 1:2 is required and the beam converting prism has the index of refraction of 1.51, the incident angle of the light beam with respect to the beam converting surface is set to 66.57°.

In contrast, according to the present invention in which the beam converting optical system 114 comprises the two beam converting prisms 116 and 118, if the beam converting ratio 1:2 is required for the beam converting optical system 114 as a whole, the beam converting ratio required for each beam converting prism 116 or 118 is 1:1.41, on the assumption that the two prisms equivalently contribute to the beam conversion. In this case, the incident angle of the light beam with respect to the beam converting surface is set to 53.11°, if the beam converting prism has the index of refraction of 1.51. The incident angle is smaller as compared to the case where the beam converting optical system 114 comprises a single beam converting prism.

Figure 6:
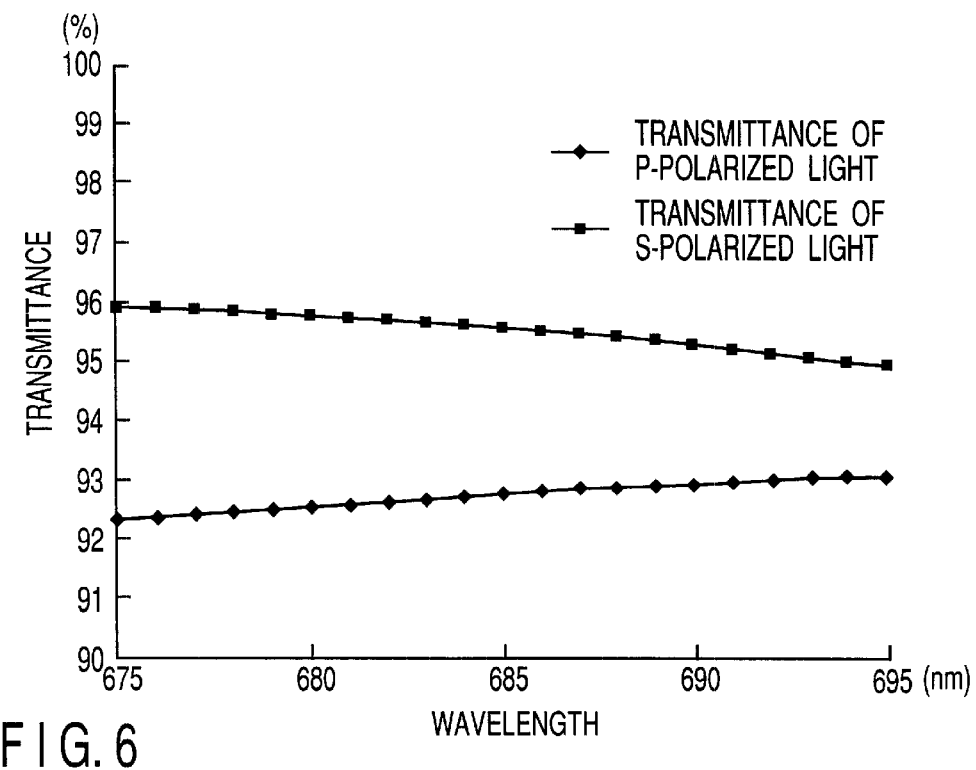
FIG. 6 is a graph showing transmittance of an antireflection film with respect to p-polarized light and s-polarized light of the incident angle of 66.57°.
Figure 7:
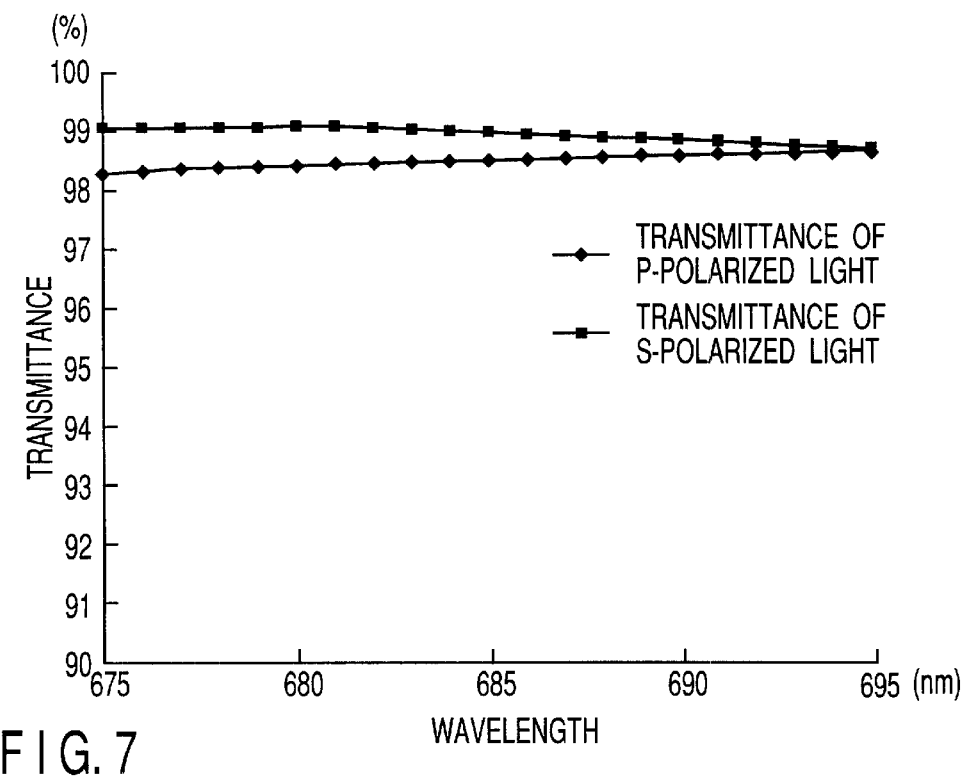
FIG. 7 is a graph showing transmittance of an antireflection film with respect to p-polarized light and s-polarized light of the incident angle of 53.11°.

FIG. 6 shows transmittance of an antireflection film with respect to p-polarized light and s-polarized light of the incident angle of 66.57°, and FIG. 7 shows transmittance of an antireflection film with respect to p-polarized light and s-polarized light of the incident angle of 53.11°. The antireflection film comprises three layers: two films of high index of refraction having the index of refraction of 2.25 and a film of low index of refraction having the index of refraction of 1.46. More specifically, the antireflection film is made of a high index-of-refraction film of the thickness of 41 nm, a low index-of-refraction film of the thickness of 111 nm and a high index-of-refraction film of the thickness of 18 nm, which are laminated in this order.

As can be understood from FIG. 6 relating to a light beam of the incident angle of 66.57°, transmittance of the antireflection film is lower than 94% with respect to p-polarized light, and 96% or lower with respect to s-polarized light. Thus, it is difficult for the antireflection film to efficiently transmit both p-polarized light and s-polarized light.

If the required beam converting ratio is greater than 1:2, the incident angle of the light beam will be increased accordingly. In this case, it is more difficult to design or produce an antireflection film suitable for both p-polarized light and s-polarized light.

In contrast, as can be understood from FIG. 7 relating to light beam of the incident angle of 55.11°, transmittance of the antireflection film is higher than 98% with respect to both p-polarized light and s-polarized light. Thus, the antireflection film can efficiently transmit both p-polarized light and s-polarized light. Moreover, there is little difference in transmittance between s and p polarization.

In the beam converting optical system that comprises a single beam converting prism, light beam passes the antireflection film once. In the beam converting optical system that comprises two beam converting prisms, light beam passes the antireflection film twice. Therefore, the transmittance shown in FIG. 6 should be compared with the square of the transmittance shown in FIG. 7. The latter is higher than the former.

Therefore, the beam converting optical system that comprises two beam converting prisms has more excellent optical characteristics than those of the beam converting optical system that comprises one beam converting prism. In other words, it is easier to design an antireflection film of the beam converting optical system that comprises two beam converting prisms to obtain required optical characteristics, as compared to that of the beam converting optical system that comprises one beam converting prism.

Consequently, the optical pickup device of the present embodiment can detect signal component light at a higher S/N ratio and accordingly reproduce a signal of higher quality as compared to the conventional apparatus that includes only one beam converting prism.

The beam converting optical system may comprise three or more beam converting prisms. In this case, it is more easier to design an antireflection film.

Astigmatism Suppressing Function

Further, according to the optical pickup device of the present embodiment, the beam converting optical system 114 has the two beam converting prisms 116 and 118, which are arranged symmetrically with respect to the optical axis. Therefore, the optical pickup device has a considerable advantage that occurrence of astigmatism, due to a change in length of the optical path between the light source and the collimate lens, is suppressed.

The conventional beam converting optical system comprising a beam converting prism has no problem, if the incident beam is completely collimated. If not, however, astigmatism will occur due to the anamorphic characteristic of the beam converting prism. The astigmatism forms a distorted spot on the optical disk and adversely influences record and reproduction of information.

The parallelism of the light beam incident on the beam converting prism depends on the length of the optical path between the light source and the collimate lens. In particular, since the recent large-capacity and high-density optical disk has a close tolerance to astigmatism, the light beam incident on the beam converting prism is required to be always parallel with high accuracy.

The integrated optical unit has a number of factors which change the length of the optical path between the light source and the collimate lens. This is because the unit includes a number of optical elements, and some of the optical elements and supporting members thereof are made of resin, such as plastic, for the purpose of solving production problems, for example, to reduce costs.

Therefore, even if the integrated optical unit is assembled and adjusted so as to be free from astigmatism, the length of the optical path between the light source and the collimate lens is liable to change due to temperature or humidity characteristics of the number of intervening optical elements and the supporting members thereof.

Consequently, so long as the integrated optical unit is used, it is practically difficult to keep parallel the light beam incident on the beam converting optical system with high accuracy.

However, the beam converting optical system 114 of the optical pickup device of the present embodiment has a function of suppressing occurrence of the astigmatism. The astigmatism suppressing function will be described with reference to FIG. 1.

If the light beam output from the collimate lens 112 is divergent due to a reduction in degree of parallelization, the light beam converted by the beam converting prism 116 has astigmatism due to the anamorphic characteristic that the beam converting prism 116 has different powers in the directions parallel and perpendicular to the plane of the drawing.

However, after converted by the beam converting prism 116, the light beam is converted by the beam converting prism 118 arranged symmetric to the beam converting prism 116 with respect to the optical axis. As a result, the astigmatism caused by passing through the beam converting prism 116 is canceled by passing through the beam converting prism 118.

More specifically, when the light beam is divergent, a ray of light incident on, for example, an upper end portion of the first beam converting prism 116 has a small incident angle with respect to the entrance surface of the first beam converting prism 116. To the contrary, the ray of light has a correspondingly large incident angle with respect to the entrance surface of the second beam converting prism 118. Therefore, the powers varied by the refraction at the entrance surfaces have the opposite polarities, such that the astigmatism is canceled in total.

On the other hand, a ray of light incident on a lower end portion of the first beam converting prism 116 has a large incident angle with respect to the entrance surface of the first beam converting prism 116, whereas the ray of light has a correspondingly small incident angle with respect to the entrance surface of the second beam converting prism 118. As a result, the astigmatism is canceled in total for the same reason as described above.

In contrast, if the incident light beam is not divergent but convergent, the beam converting optical system operates in the opposite way to that described above. Since the powers varied by the refraction at the entrance surfaces also have the opposite polarities, the astigmatism is canceled in total.

Thus, even if the light beam incident on the beam converting prism 116 is not completely parallel, the light beam after the beam conversion, i.e., the light beam passed through the two beam converting beam prisms 116 and 118 has no astigmatism.

Reduction in degree of parallelization of the light beam is particularly remarkable in an optical pickup device that includes an integrated optical unit like the embodiment of the present invention. For example, the hologram element 136 shown in FIG. 2 is generally made of resin or plastic material in order to make the production easy and reduce the costs. For this reason, the index of refraction is easily varied in accordance with a change in temperature: the rate of change is as high as about $10^{-4}$ /° C.

For example, when the ambient temperature changes from 5° C. to 55° C., the index of refraction is changed by $5 \times 10^{-3}$, i.e., 0.5%. If the hologram element 136 is about 2 mm to 3 mm thick, the change of the index of refraction corresponds to a change of about 10 $\mu$m in length of the optical path. This is equivalent to the change of about 10 $\mu$m in distance between the collimate lens and the semiconductor laser in accordance with the change in temperature. The amount of change cannot be tolerated in a conventional beam converting optical system that has a single beam converting prism.

Moreover, in the integrate optical unit as described above, not only the hologram element but also the package is generally made of resin to reduce costs. Therefore, the positional relationship between a fixed portion of the package and the semiconductor laser and/or the collimate lens is easily changed. This is also a factor of a substantial change in the length of the optical path.

However, according to the present embodiment, the beam is converted by the first and second beam converting prisms, and the incident angles with respect to the entrance surfaces of the prisms are reverse in sign of the inclination. Therefore, the astigmatism which occurs due to a reduction in parallelization of the beam is canceled. As a result, the demand for the parallelism of the beam incident on the beam converting prism 116 is greatly released. Accordingly, the accuracy needed for the distance between the collimate lens and the semiconductor laser is considerably reduced. In addition, the tolerance to the change in index of refraction of optical elements interposed therebetween is considerably increased.

Therefore, even if the integrated optical unit has a number of elements highly dependent on temperature, the astigmatism after the beam conversion can be suppressed to a minimum. For this reason, a low-cost integrated optical unit can be used with a high degree of reliability in an optical disk apparatus, wherein a high coupling efficiency is required to be maintained. Thus, the present invention contributes to provide a inexpensive optical disk apparatus having high performance.

According to the present embodiment, the two beam converting prisms have the same vertex angle. However, the vertex angles of the prisms may be slightly different. So long as the prisms are arranged symmetrically with respect to the optical axis, the astigmatism can be substantially canceled. The two beam converting prisms may have different indexes of refraction. In this case, the vertex angles are determined in consideration of the difference in index of refraction.

Further, the beam converting optical system may have three or more beam converting prisms. In this case, the beam converting ratio and the directions of the beams are selected, by which the effect of suppressing occurrence of the astigmatism is maximized in total.

Furthermore, the beam converting optical system does not necessarily convert a light beam to have perfectly circular distribution of quantity of light. The beam converting ratios of the first and second prisms may be suitably set in a range where the coupling efficiency is improved. For example, the light beam emitted from the semiconductor laser having distribution of quantity of light, in which the ratio of the major axis to the minor axis is generally about 2.5, may be converted to a light beam having distribution of quantity of light in which the ratio is about 1.5. Even in this case, the coupling efficiency can be satisfactory improved.

SECOND EMBODIMENT

Figure 9:
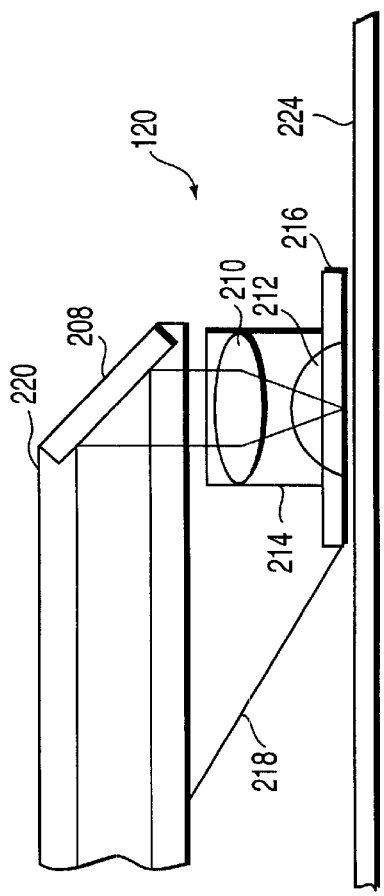
FIG. 9 is a schematic view of an objective optical section of the optical pickup shown in FIG. 8.
Figure 8:
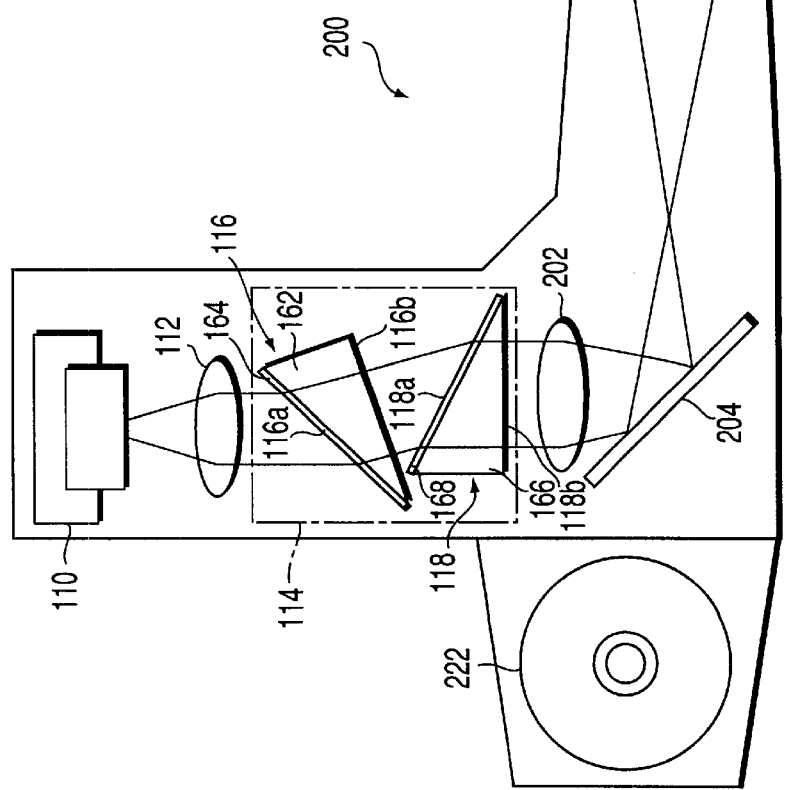
FIG. 8 is a plan view of an optical pickup device according to a second embodiment of the present invention.

An optical pickup device according to a second embodiment of the present invention will be described with reference to FIGS. 8 and 9. In FIGS. 8 and 9, the same reference numerals as those used in FIG. 1 denote the same members as those shown in FIG. 1. Detailed descriptions of the members will be omitted from the following description.
Structure The second embodiment relates to an optical pickup device that performs near-field recording by means of a solid immersion lens (SIL) for recording and reproducing information at higher recording density.

As shown in FIG. 8, the optical pickup device comprises an integrated optical unit 110 including a semiconductor laser serving as a light source, a photodiode for detecting a signal, a collimate lens 112 for collimating a light beam emitted from the integrated optical unit 110 to a substantially parallel light beam, and a beam converting optical system 114 for converting an incident light beam generally having elliptic distribution of quantity of light to a light beam having substantially circular distribution of quantity of light.

The beam converting optical system 114 has a first beam converting prism 116 and a second beam converting prism 118. Each of the beam converting prisms 116 and 118 has an entrance surface and an exit surface which are not parallel to each other. The first and second beam converting prisms 116 and 118 are arranged so that the entrance surfaces 116*a* and 118*a* are oblique with respect to the optical axis, whereas the exit surfaces 116*b* and 118*b* are perpendicular to the optical axis. The vertex angles of the beam converting prisms 116 and 118 are of the same degree and located on the opposite sides of the optical axis. Therefore, the inclination of the entrance direction of the light beam to the entrance surface of the first prism 116 is reverse in sign to the inclination of the entrance direction of the light beam to the entrance surface of the second prism.

The optical pickup device further comprises a first relay lens 202 for converting the light beam output from the second beam converting prism 118 to a convergent light beam, a galvano-mirror 204 rotatable about an axis perpendicular to the plane of the drawing, a second relay lens 206 for converting the light beam output from the galvano-mirror 204 to a parallel light beam, and a mirror 208 for 90° deflecting the light beam output from the second relay lens 206 downward in the drawing.

The optical elements described above are mounted in an L-shaped housing 220. The housing 220 is supported so as to be rotatabe on a plane parallel to the drawing by means of a voice coil motor 222.

As shown in FIG. 9, the optical pickup device further comprises an objective optical section 120 for converging the light beam on an optical disk 224. As in the first embodiment, the optical disk 224 has a recording film, which stores information. The information corresponds to changes in reflectivity of the recording film.

The objective optical section 120 comprises the mirror 208 for deflecting the light beam, a prefocus lens 210 for converging the light beam output from the mirror 208, a solid immersion lens 212 for further converging the light beam converged by the prefocus lens 210, a lens frame 216 supporting the two lenses 210 and 212, a slider 214 on which the lens frame 216 is mounted, and a support spring 218, connected to the housing 220, for allowing the slider 214 to rise. The slider 214 is caused to move up by an air flow generated by rotation of the optical disk 224. The distance between the solid immersion lens 212 and the optical disk 224 is controlled in accordance with the amount of rise of the slider.

Operation

As shown in FIGS. 8 and 9, the light beam emitted from the integrated optical unit 110 is collimated by the collimate lens 112. As in the first embodiment, the collimated light beam is converted to a beam having circular distribution of quantity of light by passing through the first and second beam converting prisms 116 and 118. Thereafter, the light beam is converted by the first relay lens 202 to a convergent light, which is reflected by the galvano-mirror 204. Then, the convergent light is converted to a parallel light beam again by the second relay lens 206, and deflected by the mirror 208 toward the optical disk 224.

The galvano-mirror 204 is rotatable about an axis perpendicular to the plane of the drawing. Rotation of the galvano-mirror 204 achieves tracking control, wherein the light beam is caused to follow an information track on the optical disk 224.

The light beam reflected by the mirror 208 is converged by the prefocus lens 210 and further by the solid immersion lens 212. Assuming that the index of refraction of the solid immersion lens 212 is n, the wavelength of the light beam inside the solid immersion lens 212 is equivalent to 1/n. Therefore, the diameter of the beam spot is reduced to about 1/n as, which is smaller than that in the case where the solid immersion lens 212 is not used. Since information is recorded or reproduced by means of the very small spot, recording and reproducing densities can be much higher than those of the conventional optical disk apparatus. As a result, a large-capacity optical disk apparatus can be realized.

A front focal point of the lens system constituted by the solid immersion lens 212 and the prefocus lens 210 (the position where a parallel beam incident from the side of the optical disk 224 is focused) is arranged to be substantially conjugate to the galvano-mirror 204 with respect to the second relay lens 206. By this arrangement, parallel movement of return light from the optical disk 224, which occurs when the galvano-mirror 204 is rotated, is suppressed on the photodiode surface of the integrated optical unit 110. In addition, when the light beam is deflected by the galvano-mirror 204, it is prevented from going out of the mirror 208, the prefocus lens 210 and the solid immersion lens 212. Further, since the first relay lens 202 and the second relay lens 206 are arranged at confocal positions, the parallel light beam projected from the beam converting prism can enter the prefocus lens 210 as a parallel light beam again.

In the optical pickup device as described above, a seek (access) operation and a tracking operation are performed by the voice coil motor 222 and the galvano-mirror 204. The focus is controlled in accordance with the amount of rise of the slider 214.

The optical disk 224 is not of the type like the conventional optical disk, in which a recording film is covered by a cover glass and information is written in and read from the recording film via the cover glass. It is an optical disk of the so-called "film-surface recording" type, in which the recording film is only coated with a very thin protecting coat and information is written in and read from the recording film not via a cover glass. This structure is employed in order to improve the efficiency of coupling between the very small spot converged by the solid immersion lens 212 and the recording film.

In the optical pickup device for performing high-density recording and reproducing by means of the solid immersion lens, the aberration must be suppressed to a much smaller degree than that in the optical disk apparatus of the type of the first embodiment. In the second embodiment, the astigmatism, which occurs in a beam converting prism, is allowed little.

In the present embodiment, the two beam converting prisms 116 and 118 constituting the beam converting optical system 114 are symmetrical with respect to the optical axis. Therefore, even if the incident light beam is not parallel, the converted light beam has no astigmatism. For this reason, an inexpensive integrated optical unit can be applied, while the structure for a super high-density recording is employed.

As can be understood from the detailed description of the first embodiment, the beam converting prisms 116 and 118 have high transmittance with respect to both p-polarized light and s-polarized light. Therefore, the optical pickup device of the present embodiment can detect a signal at a higher S/N ratio.

Function for Suppressing Tracking Error due to Change in Wavelength

The optical pickup device shown in FIGS. 8 and 9 also has a function for suppressing a tracking error due to a change in power of the semiconductor laser, for example, a shift from the read state for reading information to the write state for writing information. The function will be described below.

When an output of the semiconductor laser is changed abruptly, the wavelength of the light beam is changed. In general, since the index of refraction of a beam converting prism depends on the wavelength, the angle of refraction is changed in accordance with the change in wavelength.

Therefore, if the beam conversion is performed in only one direction, i.e., if the light beam is converted by a single beam converting prism, the angle of refraction is changed by the change in wavelength of the light beam. As a result, the angle of the light beam output from the beam converting prism is changed. The direction of change is the same as the direction of deflection when the galvano-mirror performs tracking. Therefore, the spot focused on the optical disk 224 is shifted in accordance with the change in angle in a direction across information tracks on the optical disk 224.

The aforementioned shift means that the light spot is instantaneously moved from the information track, which has been followed by the light beam, to another information track. If a writing operation is continued in this state, information will be written in an improper information track, different from an information track in which the information should be written. If any information has been written in the improper information track, the information will be damaged. This is a problem fatal to an optical disk apparatus.

However, since the optical pickup device shown in FIGS. 8 and 9 performs beam conversion twice in the reverse directions, the changes in angle of refraction at the first and second beam converting prisms 116 and 118 have the opposite polarities and therefore canceled. For this reason, even if the wavelength is changed, the spot position on the optical disk 224 is not changed. As a result, the reliability of the device is improved.

As described above, even in the structure wherein information is recorded and reproduced at higher density as in near-field recording by means of a solid immersion lens, the present embodiment considerably increases the tolerance to the reduction in degree of parallelization or the change in wavelength of the light beam incident on the beam converting prism. Thus, the present embodiment has advantages that the costs required for the use of an integrated optical unit is reduced, and the reliability is improved since it is not easily influenced by a change in wavelength.

THIRD EMBODIMENT

Figure 10:
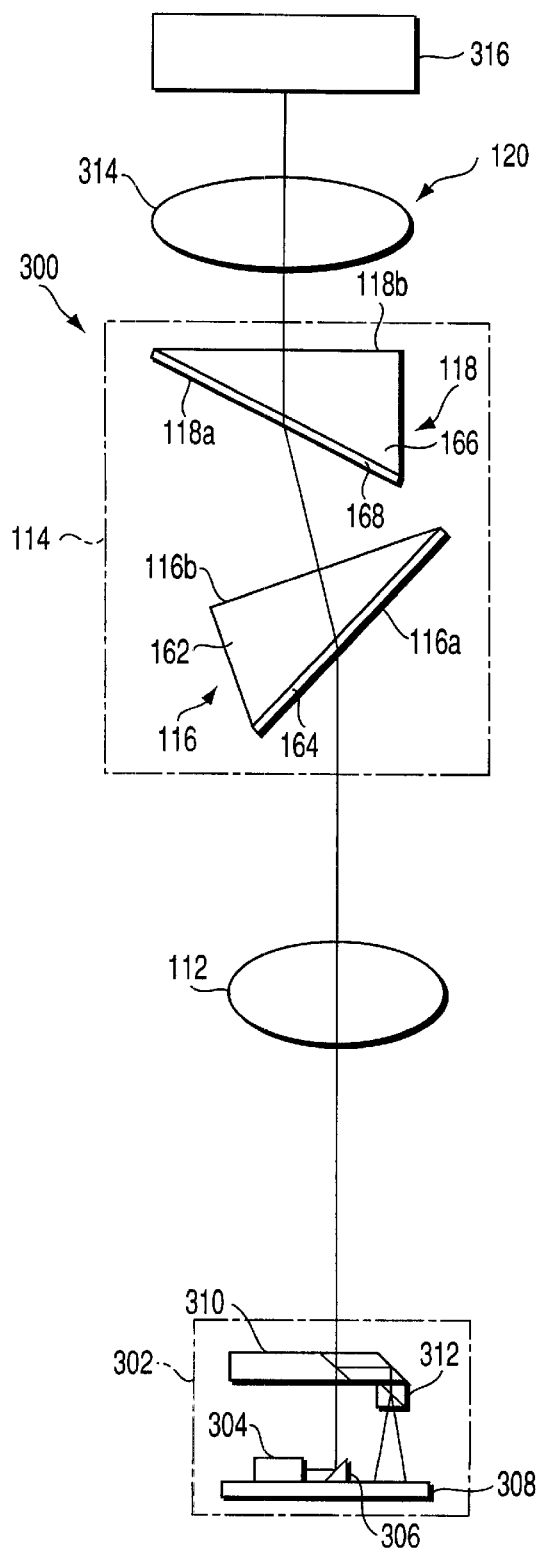
FIG. 10 is a schematic view of an optical pickup device according to a third embodiment of the present invention.

An optical pickup device according to a third embodiment of the present invention will be described with reference to FIG. 10. In FIG. 10, the same reference numerals as those used in FIG. 1 denote the same members as those shown in FIG. 1. Detailed descriptions of the members will be omitted from the following description.

As shown in FIG. 10, the optical pickup device comprises an integrated optical unit 302, a collimate lens 112 for collimating a light beam projected from the integrated optical unit 302, a beam converting optical system 114 for converting the light beam projected from the integrated optical unit 302, which generally has elliptic distribution of quantity of light, to a light beam having substantially circular distribution of quantity of light, and an objective optical section 120 or objective lens 314 for converging the light beam on an magneto-optical disk 316. The magneto-optical disk 316 has a recording film, which stores information. The information corresponds to changes in magnetic pole of the recording film.

The integrated optical unit 302 includes a semiconductor laser 304 for emitting a light beam, a reflection prism 306 for deflecting the light beam emitted from the semiconductor laser 304, and a semiconductor substrate 308 having an information signal detecting section for detecting an information signal based on a return light beam. The information signal detecting section includes a plurality of optical detectors. The semiconductor laser 304 and the reflection prism 306 are fixed to the semiconductor substrate 308. The light beam emitted from the semiconductor laser 304 parallel with the main surface of the semiconductor substrate 308 is directed toward the collimate lens 112 by the reflection prism 306.

The integrated optical unit 302 further comprises a beam splitter 310 for splitting the return light beam reflected by the magneto-optical disk 316 from the go light beam toward the disk, and a Wollaston polarizing prism 312 for deflecting the light beam of the component split by a splitting optical element in accordance with the polarization to create two light beams having polarized components perpendicular to each other. The split two light beams are respectively directed to optical detectors included in the information signal detecting section of the semiconductor substrate 308.

The beam converting optical system 114 has a first beam converting prism 116 and a second beam converting prism 118. The first and second beam converting prisms 116 and 118 are arranged so that entrance surfaces 116a and 118a are oblique with respect to the optical axis, whereas exit surfaces 116b and 118b are perpendicular to the optical axis, respectively.

The beam converting prisms 116 and 118 respectively comprise transparent main bodies 162 and 166, each of which has two surfaces nonparallel to each other, and antireflection films 164 and 168 formed on one of the surfaces of the main bodies 162 and 166, respectively. The antireflection films 164 and 168 have exposed surfaces which define the entrance surfaces 116a and 118a, respectively. The other of the surfaces of the main bodies 162 and 166 define the exit surfaces 116b and 118b, respectively.

Further, the beam converting prisms 116 and 118 are arranged symmetrical with respect to the optical axis. In other words, the beam converting prisms 116 and 118 are located so that the vertex angles thereof are on the opposite sides of the optical axis. Therefore, the inclination of the incident light beam to the entrance surface 116a of the beam converting prism 116 is reverse in sign to the inclination of the incident light beam to the entrance surface 118a of the beam converting prism 118.

The light beam emitted from the semiconductor laser 304, having elliptic distribution of quantity of light, is reflected by the reflection prism 306. Then, passing through the beam splitter 310, the light beam is substantially collimated by the collimate lens 112. The substantially collimated light beam still has elliptic distribution of quantity of light.

The substantially collimated light beam having elliptic distribution of quantity of light is converted by the beam converting optical system 114 to a light beam having substantially circular distribution of quantity of light. More specifically, the light beam having elliptic distribution of quantity of light is converted by the first beam converting prism 116 to a light beam having circularly elliptic distribution of quantity of light, which is then converted by the second beam converging prism 118 to a light beam having much circularly elliptic distribution of quantity of light, i.e., substantially circular distribution of quantity of light.

For example, the ratio of the major axis to the minor axis of the ellipse of the distribution of quantity of light that enters the beam converting optical system 114 is about 2.5. The ratio of the major axis to the minor axis of the ellipse of the distribution of quantity of light that has passed through the beam converting optical system 114 is preferably about 1.5 or less, and most preferably 1.

The converted light beam is focused by the objective lens 314 on the magneto-optical disk 316. The light beam reflected by the optical disk 316 returns to the beam splitter 310 through the same path as described above in the reverse direction, and is separated from the path of the go light beam by the beam splitter 310. The separated return light beam is split by the Wollaston polarizing prism 312 into two beams in accordance with the polarization. The two beams enter the optical detectors on the semiconductor substrate 308. Each of the optical detectors outputs a signal in accordance with the amount of incident light. Based on the signal, an information signal, a focus error signal and a tracking error signal are obtained by a signal processing unit (not shown).

As described above, in a reproduction of information recorded on the magneto-optical disk, the polarization of the return light beam is detected. Assuming that the light beam emitted from the semiconductor laser 304 includes a p-polarized light component, the return light beam includes an s-polarized light component, i.e., a signal component. Therefore, it is preferable that the beam converting prisms 116 and 118 have high transmittance with respect to both p-polarized light and s-polarized light.

As can be understood from the detailed description of the first embodiment, the beam converting prisms 116 and 118 have high transmittance with respect to both p-polarized light and s-polarized light. Therefore, the optical pickup device of the present embodiment can detect a signal at a higher S/N ratio as compared to the optical pickup device having a single beam converting prism.

In addition, as in the first embodiment, the two beam converting prisms 116 and 118 are arranged symmetric with respect to the optical axis. Therefore, the optical pickup device of the present embodiment also suppresses occurrence of astigmatism due to a change in length of the optical path between the light source and the collimate lens.

FOURTH EMBODIMENT

Figure 11:
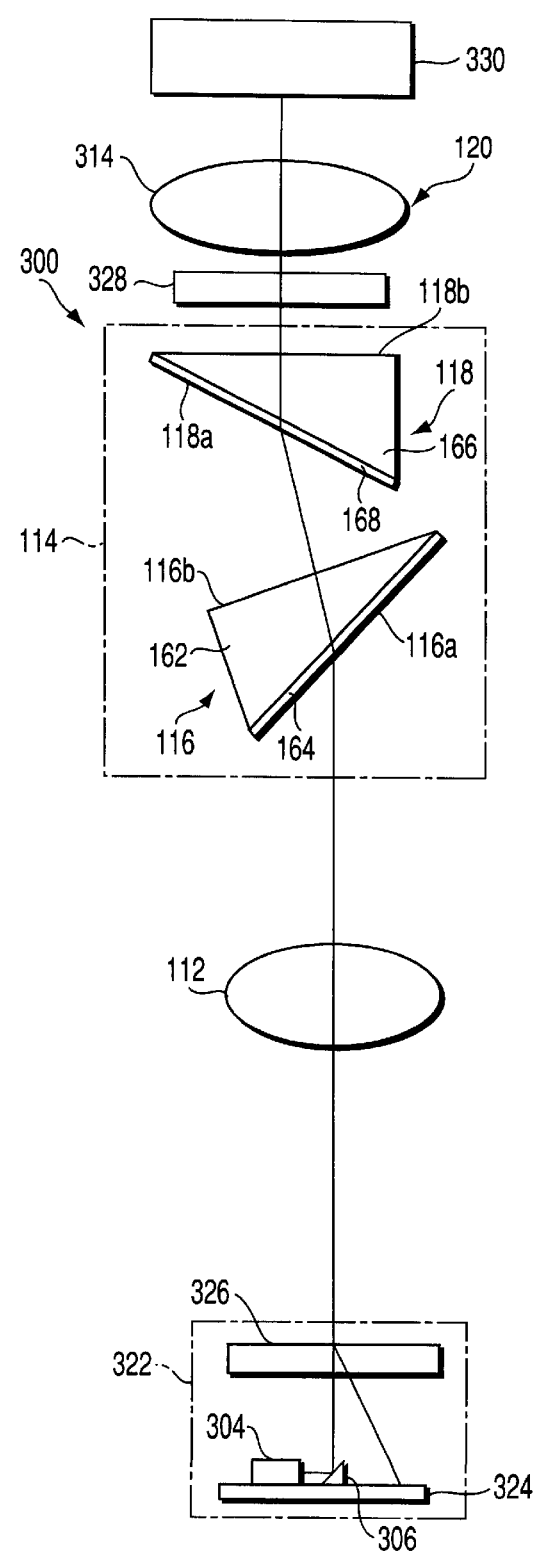
FIG. 11 is a schematic view of an optical pickup device according to a fourth embodiment of the present invention.

An optical pickup device according to a fourth embodiment of the present invention will be described with reference to FIG. 11. In FIG. 11, the same reference numerals as those used in FIG. 1 denote the same members as those shown in FIG. 1. Detailed descriptions of the members will be omitted from the following description.

As shown in FIG. 11, the optical pickup device comprises an integrated optical unit 322, a collimate lens 112 for collimating a light beam projected from the integrated optical unit 322, a beam converting optical system 114 for converting the light beam projected from the integrated optical unit 322, which generally has elliptic distribution of quantity of light, to a light beam having substantially circular distribution of quantity of light, an objective optical section 120 or objective lens 314 for converging the light beam on an optical disk 330, and a ¼ wavelength plate 328 interposed between the beam converting optical system 114 and the objective lens 314.

The optical disk 330 has a recording film, which stores information. The information corresponds to changes in reflectivity of the recording film, as in a phase change disk and a ROM disk.

The integrated optical unit 322 includes a semiconductor laser 304 for emitting a light beam, a reflection prism 306 for deflecting the light beam emitted from the semiconductor laser 304, a semiconductor substrate 324 having an information signal detecting section or optical detector for detecting an information signal based on a return light beam, and a hologram element 326 for separating the return light beam returned from the optical disk 330 and directing the separated beam to the optical detector on the semiconductor substrate 324.

The beam converting optical system 114 has a first beam converting prism 116 and a second beam converting prism 118. The first and second beam converting prisms 116 and 118 are arranged so that entrance surfaces 116a and 118a are oblique with respect to the optical axis, whereas exit surfaces 116b and 118b are perpendicular to the optical axis, respectively.

The beam converting prisms 116 and 118 respectively comprise transparent main bodies 162 and 166, each of which has two surfaces nonparallel to each other, and antireflection films 164 and 168 formed on one of the surfaces of the main bodies 162 and 166, respectively. The antireflection films 164 and 168 have exposed surfaces which define the entrance surfaces 116a and 118a, respectively. The other of the surfaces of the main bodies 162 and 166 define the exit surfaces 116b and 118b, respectively.

Further, the beam converting prisms 116 and 118 are arranged symmetrical with respect to the optical axis. In other words, the beam converting prisms 116 and 118 are located so that the vertex angles thereof are on the opposite sides of the optical axis. Therefore, the inclination of the incident light beam to the entrance surface 116a of the beam converting prism 116 is reverse in sign to the inclination of the incident light beam to the entrance surface 118a of the beam converting prism 118.

The light beam emitted from the semiconductor laser 304, having elliptic distribution of quantity of light, is reflected by the reflection prism 306. Then, after passing through the hologram element 326, the light beam is substantially collimated by the collimate lens 112. The substantially collimated light beam still has elliptic distribution of quantity of light.

The substantially collimated light beam having elliptic distribution of quantity of light is converted by beam converting optical system 114 to a light beam having substantially circular distribution of quantity of light. More specifically, the light beam having elliptic distribution of quantity of light is converted by the first beam converting prism 116 to a light beam having circularly elliptic distribution of quantity of light, which is then converted by the second beam converging prism 118 to a light beam having much circularly elliptic distribution of quantity of light, i.e., substantially circular distribution of quantity of light.

For example, the ratio of the major axis to the minor axis of the ellipse of the distribution of quantity of light that enters the beam converting optical system 114 is about 2.5. The ratio of the major axis to the minor axis of the ellipse of the distribution of quantity of light that has passed through the beam converting optical system 114 is preferably about 1.5 or less, and most preferably 1.

The converted light beam is circularly polarized through the ¼ wavelength plate 328 and focused by the objective lens 314 on the optical disk 330. The light beam reflected by the optical disk 330 returns to the hologram element 326 through the same path as described above in the reverse direction, and is separated from the path of the go light beam by the hologram element 326. If the light beam emitted from the semiconductor laser 304 is a p-polarized beam, and the return light beam is an s-polarized beam, since it passes the ¼ wavelength plate twice in the go and return paths. The return light beam is diffracted by the hologram element 326 and enters the optical detector on the semiconductor substrate 324. The optical detector outputs a signal in accordance with the amount of incident light. Based on the signal, an information signal, a focus error signal and a tracking error signal are obtained by a signal processing unit (not shown).

In an optical pickup device for detecting a difference in reflectivity of a recording medium as described above, assuming that the light beam emitted from the semiconductor laser 304 is a p-polarized light beam, the return light beam is an s-polarized light beam. Therefore, it is preferable that the beam converting prisms 116 and 118 have high transmittance with respect to both p-polarized light and s-polarized light.

As can be understood from the detailed description of the first embodiment, the beam converting prisms 116 and 118 have high transmittance with respect to both p-polarized light and s-polarized light. Therefore, the optical pickup device of the present embodiment can detect a signal at a higher S/N ratio as compared to the optical pickup device having a single beam converting prism.

In addition, as in the first embodiment, the two beam converting prisms 116 and 118 are arranged symmetric with respect to the optical axis. Therefore, the optical pickup device of the present embodiment also suppresses occurrence of astigmatism due to a change in length of the optical path between the light source and the collimate lens.

Further, since the light beam incident on the optical disk 330 is of circularly polarized light, the optical pickup device of the present embodiment is, advantageously, hardly affected by birefringence at the optical disk 330.

According to any one of the above embodiments, the optical pickup device comprises an integrated optical unit in which a light source and a detector or the like are integrally incorporated in a package. However, the present invention is not limited to this structure. In other words, the present invention can be applied in the same manner as described above to an optical pickup device in which members corresponding to the elements contained in the integrated optical unit are individually attached to a base. Such a device also has advantages of the signal detection at a high S/N ratio and the suppression of occurrence of astigmatism.

The present invention can be applied to any type of optical pickup device that has a separating optical element for separating a return light beam returned from the optical disk from a go light beam. The present invention provides any pickup device of this type with the advantages of the signal detection at a high S/N ratio and the suppression of occurrence of astigmatism.

The present invention is applied not only to an optical pickup device having a separating optical element made of resin. It can also provide the same advantages to an optical pickup device having an optical pickup element made of glass, in which the temperature changes comparatively a little.

In the beam converting optical system in any one of the above embodiments, an elliptic beam is converted to a light beam having substantially circular distribution of quantity of light by expanding the beam diameter. However, it may be converted to a light beam having substantially circular distribution of quantity of light by reducing the beam diameter. In other words, although the beam converting optical system of the above embodiments converts a light beam so as to extend the minor axis of the elliptic distribution of quantity of light, it may convert a light beam so as to shorten the major axis of the elliptic distribution of quantity of light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical pickup device for recording/reproducing information on/from an optical recording medium, comprising:

a light source for emitting a light beam having a generally elliptic distribution of quantity of light;

a beam converting optical system for converting the light beam emitted from the light source to a light beam having a substantially circular distribution of quantity of light;

an objective optical section for converging the light beam on the optical recording medium; and a signal detecting system for reproducing information based on a return light beam returned from the optical recording medium;

wherein the signal detecting system includes a separating optical element for separating at least partially the return light beam returned from the optical recording medium from a go light beam, and an information signal detecting section for detecting an information signal based on the separated return light beam, said separating optical element being located between the light source and the beam converting optical system;

wherein the beam converting optical system comprises a first beam converting prism and a second beam converting prism which are optically transparent, each of the first and second beam converting prisms having two nonparallel optical surfaces extending across an optical axis, one of the optical surfaces being an entrance surface through which the light beam to be converted enters and the other of the optical surfaces being an exit surface through which the converted light beam exits, and each of the first and second beam converting prisms being arranged so that the entrance surface is oblique with respect to the optical axis and the exit surface is perpendicular to the optical axis; and wherein each of the first and second beam converting prisms comprises a transparent main body having two surfaces nonparallel to each other and an antireflection film formed on at least one of the surfaces, the antireflection film has an exposed surface which defines the entrance surface, and the other of the surfaces defines the exit surface.

2. An optical pickup device according to claim 1, wherein the first and second beam converting prisms have the same optical characteristics.

3. An optical pickup device according to claim 2, wherein the first and second beam converting prisms have the same vertex angles and are made of the same material.

4. An optical pickup device according to claim 1, wherein the signal detecting system includes a diffracting optical element for selectively diffracting a beam of a light component which has not been separated by the separating optical element to create at least two beams of diffracted light of an order of ±1, and a servo signal detecting section for detecting a servo signal based on the beams of the diffracted light of the order of ±1.

5. An optical pickup device according to claim 1, wherein the information signal detecting section comprises at least one optical detector for detecting a light beam quantity, and the optical pickup device detects information recorded in the optical recording medium as a change in reflectivity.

6. An optical pickup device according to claim 1, wherein the signal detecting system further includes a polarized light separating element for deflecting a beam of a light component separated by the separating optical element in a polarized manner to create two beams of polarized light components perpendicular to each other, and wherein the information signal detecting section includes a pair of optical detectors for detecting respective quantities of light of the two beams, and the optical pickup device detects information recorded in the optical recording medium as a change in magnetic pole.

7. An optical pickup device according to claim 1, wherein the objective section includes an objective lens.

8. An optical pickup device according to claim 1, wherein the objective optical section includes a prefocus lens for converging a light beam, a solid immersion lens for further converging the light beam converged by the prefocus lens, a lens frame for holding the prefocus lens and the solid immersion lens, a slider on which the lens frame is mounted, and a support spring for supporting the slider so as to rise.

9. An optical pickup device according to claim 1, wherein the first and second beam converting prisms are arranged symmetrically with respect to the optical axis so that vertex angles of the first and second beam converting prisms are on opposite sides of the optical axis, and so that an inclination of the light beam to the entrance surface of the first beam converting prism is reverse in sign to an inclination of the light beam to the entrance surface of the second beam converting prism.

10. An optical pickup device according to claim 9, wherein the first and second beam converting prisms have the same optical characteristics.

11. An optical pickup device according to claim 10, wherein the first and second beam converting prisms have the same angles and are made of the same material.

* * * * *